United States Patent Office 3,776,899
Patented Dec. 4, 1973

3,776,899
METHOD FOR THE PREPARATION OF O-SUBSTI-TUTED-6-AZACYTININES AND 6-AZACYTIDINE
Vladimir Panteleevich Chernetsky and Inna Vladimirovna Alexeeva, Kiev, U.S.S.R., assignors to Institute Mikrobiologii Im. Akad. Dk. Zabolotnogo, Kiev, U.S.S.R.
No Drawing. Continuation-in-part of applications Ser. No. 365,183, May 5, 1964, and Ser. No. 688,654, Dec. 7, 1967, which is a continuation-in-part of application Ser. No. 367,866, May 13, 1964, all now abandoned, and Ser. No. 731,698, May 24, 1968, now Patent No. 3,522,237. This application July 24, 1970, Ser. No. 58,161
The portion of the term of the patent subsequent to July 28, 1987, has been disclaimed
Int. Cl. C07d 51/52
U.S. Cl. 260—211.5 R    12 Claims

ABSTRACT OF THE DISCLOSURE

A method in which solutions of 2',3'-O-alkylidene-5'-O-acyl-4-thio-6-azauridines or 2',3'-O-alkylidene-4-thio-6-azauridines in organic solvents are treated with ammonia at atmospheric pressure to convert the substituted azauridines to 2',3'-O-alkylidene-5-O-acyl-6-azacytidines or 2',3'-O-alkylidene-6-azacytidines which may then be converted, if desired, to free 6-azacytidine by dissolving the above substituted-6-azacytidine in an anhydrous solvent and treating same with a metal alcoholate at an alkaline pH.

CROSS-REFERENCES TO RELATED APPLICATIONS

This application is a continuation-in-part of applications Ser. No. 365,183, filed May 5, 1964, and No. 688,-654, filed Dec. 7, 1967, which is in turn a continuation-in-part of No. 367,866, filed May 13, 1964, all of which are now abandoned, and application Ser. No. 731,698, filed May 24, 1968, now Pat. No. 3,522,237.

BACKGROUND OF THE INVENTION

(1) Field of the invention

The present invention relates to methods for the preparation of 2',3'-O-alkylidene-5'-O-acyl-6-azacytidines and 2',3'-O-alkylidene-6-azacytidines including those substituted by acyl groups such as aliphatic and aromatic acyl groups and alkylidene groups such as isopropylidene and to methods for the preparation of 6-azacytidine which compounds are used for the manufacture of pharmaceuticals and in particular, to pharmaceuticals having antitumor and antivirus activity and which, in addition, are of great interest for the synthesis of a series of organic compounds useful in biochemical investigations.

(2) Description of the prior art

According to a known method, 2',3',5'-tri-O-acyl-6-azacytidines are obtained from 2',3',5'-tri-O-acyl-4-chloro-6-azauridines by treatment of the latter with liquid ammonia. However, by this method it is difficult to obtain 2',3',5'-tri-O-acyl-6-azacytidines of a sufficiently high degree of purity because the initial material is unstable and yields by-products which contaminate the desired product.

The use of a substituted chloroazauridine as the starting compound imposes certain limitations on the number of substituents at the hydroxyl groups of the ribose portion of the molecule and results in substantially diminishing the number of possible 6-azacytidine derivatives. For example, with the use of chlorine-containing derivatives it is not possible as in the present case to prepare azacytidines having alkylidene protecting groups at the 2' and 3'-hydroxyl groups of the ribose, the latter compounds being of prime importance in the synthesis of the respective nucleotides and diverse nucleoside derivatives of azacytidine. On the other hand, the alkylidene derivatives of azacytidine can be readily prepared by way of the thio derivatives used in the present invention.

In addition, the known method for obtaining 6-azacytidine starts with acylated 6-azauridine which is treated with phosphorus pentasulfide in a solution of absolute pyridine and is then submitted to the action of ammonia at 100° C. under pressure in a hermetically sealed vessel.

The disadvantage of this method is that the amination reaction (reaction with ammonia) and deacylation must be carried out under high pressure in an autoclave for a long period of time and at a high temperature.

SUMMARY OF THE INVENTION

An object of the present invention is to provide a simple method for preparing 2',3'-O-alkylidene-5'-O-acyl-6-azacytidines and 2',3'-O-alkylidene-6-azacytidines, which permits the obtention of the said products in a high state of purity and without the disadvantages attendant upon the known methods. Another object of the invention is to provide a simple method for producing the free 6-azacytidine from the 2',3'-O-alkylidene-5-O-acyl-6-azacytidines and the 2',3'-O-alkylidene-6-azacytidines, which precludes the need for using the high pressure amination reaction of the known method.

Inasmuch as the free 6-azacytidine is an important compound, it is most advantageous to have a simple method for its preparation, and it is, moreover, even more advantageous to have a method for producing same which is based on the 2',3'-O-alkylidene-5'-O-acyl-6-azacytidines and the 2',3'-O-alkylidene-6-azacytidines produced by the present invention.

The importance of having an overall process for producing both the di-O-alkylidene-O-acyl-6-azacytidines and the di-O-alkylidene-6-azacytidines and the free 6-azacytidines is enhanced by virtue of the fact that to obtain 6-azacytidine previously it was necessary to resort to the circuitous expedient of acylating the corresponding oxo compound and aminating same at high temperature and pressure. According to that circuitous process, there is always the danger that the labile amino group will be converted back to an oxo group. According to the present process, on the other hand, no such danger exists. This is accomplished by the basic finding underlying the process, to wit, that di-O-alkylidene-0-acyl-6-azacytidines and di-O-alkylidene-6-azacytidines can be hydrolyzed to 6-azacytidine (even to the extent of removing the tightly linked benzoyl group) without converting the amino group to an oxo group.

According to the invention, a 2',3'-O-alkylidine-5'-O-acyl-4-thio-6-azauridine or a 2',3'-O-alkylidene-4-thio-6-azauridine is dissolved in an organic solvent such as an alcohol, and thereafter treated with ammonia, preferably gaseous amonia by bubbling same through the solution with heating at atmospheric pressure for about 1.5–2 hours, or until the solution is saturated with ammonia to form the corresponding 2',3'-O-alkylidene-5'-O-acyl-6-azacytidine or 2',3'-O-alkylidene-6-azacytidine.

In order to thereafter form the free 6-azacytidine, the tri-O-substituted-6-azacytidine is hydrolyzed by dissolving same in an anhydrous solvent and treating the solution with a metal alcoholate at a pH of 8.5–9.5.

DETAILED DESCRIPTION OF THE INVENTION

In the method of the invention, 2',3'-O-alkylidene-5'-O-acyl-4-thio-6-azauridines or 2',3'-O-alkylidene-4-thio-6-azauridines are utilized as the initial material.

One of the above substituted-4-thio-6-azauridines is dissolved in an organic solvent, preferably in propyl alcohol, and the solution thus formed is treated with gaseous ammonia by bubbling the latter through the solution at atmospheric pressure for a period of 1.5 to 2 hours until complete saturation of the solution at its boiling point is attained. The precipitated reaction product is filtered off, washed and recrystallized.

In order to thereafter obtain the free 6-azacytidine, that end can be accomplished by dissolving the substituted-6-azacytidine, for example, a di-alkylidene-monoacyl or a di-alkylidene derivative in an anhydrous solvent and slowly adding thereto an alcoholic solution of a metal alcoholate, preferably an alkali metal alcoholate such as sodium or potassium methylate or ethylate, until the pH reaches 8.5–9.5.

The mixture obtained is stirred for about 2 hours at room temperature and atmospheric pressure and the solution is then neutralized, partially evaporated under reduced pressure and cooled, whereupon a product precipitates out. The product is filtered and dried. It is significant to note that the above hydrolysis is carried out under mild conditions without any conversion of the amino group to oxo.

The substituents in the 2', 3' and 5' positions are different from one another and may be, in the 5' position, acyl groups of both aliphatic and aromatic character such as, for example, acetyl and benzoyl, or the 5' position may be unsubstituted. The 2' and 3' positions are substituted by an alkylidene group such as isopropylidene.

In the following examples, various modifications may be made without departing from the scope of the appended claims.

EXAMPLE 1

0.52 g. of 2',3'-O-isopropylidine-5'-O-acetyl-4-thio-6-azauridine is dissolved in 25 ml. of propyl alcohol; gaseous ammonia is passed through the boiling solution at atmospheric pressure for 1.5 hours. The solvent is distilled off under a vacuum and the resulting dry precipitate is treated with alcohol, filtered and washed successively with alcohol, an alcohol-diethyl ether mixture and diethyl ether. There is obtained 0.44 g. (96 percent) of white needles having a melting point of 173–175° C.

Ultra-violet spectroscopy revealed a $\lambda_{max.}$ at $268\mu$ (in alcohol).

The chromatographic behavior of the product was observed using butanol saturated with water ($R_f=0.77$) and butanol; acetic acid:water=5:2:3 ($R_f=0.90$).

Found (percent): N, 17.33; 17.37, $C_{13}H_{18}N_4O_6$. Calcd. (percent): N, 17.19.

The foregoing example illustrates a tri-O-substituted azacytidine in which the three protecting groups are dissimilar. In a like fashion, other tri-O-substituted azacytidines (in which the O-substituents are mixed) can be prepared. Such mixed tri-O-substituted-azacytidines include those in which the 2' and 3' positions are substituted with other alkylidene groups, while 5' position is substituted with other aliphatic groups or an aromatic acyl group such as benzoyl.

In a similar fashion, there can be obtained O-substituted 6-azacytidines containing a lesser number of substituent groups than in a 2',3',5'-tri-substituted compound. Thus 2',3'-O-isopropylidene-4-thio-6-azauridine, containing a free hydroxyl group in the 5' position, is similarly converted into a corresponding derivative of 6-azacytidine.

EXAMPLE 2

2',3'-O-isopropylidene-6-azacytidine 50 mg. of 2',3'-O-isopropylidene-4-thio-6-azauridine are dissolved in 4 ml. of n-propanol; gaseous ammonia is passed through the boiling solution at atmospheric pressure for 2 hours. The solvent is then distilled off and the resulting dry precipitate is treated with alcohol. There is obtained 40 mg. (92 percent) of white needles (from ethanol) having a melting point of 198–199° C.

The chromatographic behavior of the product was observed using butanol saturated with water ($R_f=0.56$) and butanol; acetic acid:water=5:2:3 ($R_f=0.77$).

Ultra-violet spectroscopy revealed a $\lambda_{max.}$ at $263\mu$ ($\epsilon=9.01.10^3$), $\lambda_{min.}$ at $227\mu$ ($\epsilon=3.01.10^3$).

EXAMPLE 3

6-azacytidine

A solution of sodium methylate in methanol is added dropwise to 3.6 mol of 2',3'-O-isopropylidene-5'-O-acetyl-O-acetyl-6-azacytidine suspended in 55 ml. of anhydrous methanol in order to obtain a pH of 8.5–9.5. After 30 minutes of stirring, the 2',3',5'-O-substituted-6-azacytidine was completely dissolved, and a white, finely crystalline deposit of 6-azacytidine began to precipitate. Stirring was continued for a further 2.5 hours. The deposit was filtered off, rinsed with cold alcohol and thoroughly washed with chloroform and ether. 0.67 g. of 6-azacytidine was thus obtained. The methanol filtrate was neutralized with acetic acid, and the filtrate was allowed to further crystallize. Proceeding in such a manner, 0.07 g. of 6-azacytidine were separated and, after an additional concentration of the mother liquor, an additional 0.08 g. of 6-azacytidine were obtained. In total, 0.82 g. (93% of theory) of 6-azacytidine was obtained as white prisms having a melting point of 220–222° C. (from water).

What is claimed is:

1. A process comprising dissolving a compound selected from the group consisting of a 2',3'-O-alkylidene-5'-O-acyl-4-thio-6-azauridine and a 2',3'-O-alkylidene-4-thio-6-azauridine in an organic solvent, treating the thusly dissolved compound with gaseous ammonia at atmospheric pressure with heating to convert said compound to a substance selected from the group consisting of a 2',3'-O-alkylidene-5'-O-acyl-6-azacytidine and a 2',3'-O-alkylidene-6-azacytidine.

2. The process as claimed in claim 1, wherein the said compound is 2',3'-O-isopropylidene-5'-O-acetyl-4-thio-6-azauridine and 2',3'-O-isopropylidene-5'-O-acetyl-6-azacytidine is produced.

3. The process as claimed in claim 1, wherein the said compound is 2',3'-O-isopropylidene-4-thio-6-azauridine and 2',3'-O-isopropylidene-6-azacytidine is produced.

4. The process as claimed in claim 1, wherein the organic solvent is an alcohol.

5. The process as claimed in claim 4, wherein the alcohol is propyl alcohol.

6. The process as claimed in claim 1, wherein the treating with ammonia is effected for about 1.5 to 2 hours or up to the saturation point.

7. The process an claimed in claim 1 further comprising dissolving said substance in an anhydrous solvent and treating the solution with a metal alcoholate to form 6-azacytidine.

8. The process as claimed in claim 7, wherein the anhydrous solvent is absolute methyl alcohol.

9. The process as claimed in claim 7, wherein the metal alcoholate is sodium or potassium methylate.

10. The process as claimed in claim 7, wherein the treating is effected at a pH of 8.5 to 9.5 for about 2 hours at room temperature and atmospheric pressure.

11. The process as claimed in claim 7, wherein the anhydrous solvent is absolute ethyl alcohol.

12. The process as claimed in claim 7, wherein the metal alcoholate is sodium or potassium ethylate.

References Cited

UNITED STATES PATENTS

| | | | |
|---|---|---|---|
| 3,002,965 | 10/1961 | Fox et al. | 260—211.5 R |
| 3,116,282 | 12/1963 | Hunter et al. | 260—211.5 R |
| 3,328,388 | 6/1967 | Shen et al | 260—21.5 R |
| 3,350,388 | 10/1967 | Sorm et al. | 260—211.5 R |
| 3,404,144 | 10/1968 | Fox et al. | 260—211.5R |
| 3,522,237 | 7/1970 | Chernetsky et al. | 260—211.5 R |

LEWIS GOTTS, Primary Examiner

J. R. BROWN, Assistant Examiner